(12) United States Patent
Xue

(10) Patent No.: US 9,866,362 B2
(45) Date of Patent: Jan. 9, 2018

(54) METHOD AND SYSTEM FOR SEARCHING NETWORK IN LONG TERM EVOLUTION SLAVE MODE

(71) Applicant: Spreadtrum Communications (Shanghai) Co., Ltd., Zhangjiang, Shanghai (CN)

(72) Inventor: Fengting Xue, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/967,978

(22) Filed: Dec. 14, 2015

(65) Prior Publication Data

US 2016/0192367 A1 Jun. 30, 2016

(30) Foreign Application Priority Data

Dec. 31, 2014 (CN) .......................... 2014 1 0852997

(51) Int. Cl.
  *H04L 5/00* (2006.01)
  *H04W 48/20* (2009.01)
  *H04W 48/18* (2009.01)

(52) U.S. Cl.
  CPC .......... *H04L 5/0094* (2013.01); *H04L 5/0092* (2013.01); *H04W 48/20* (2013.01); *H04W 48/18* (2013.01)

(58) Field of Classification Search
  CPC H04W 72/0453; H04W 24/10; H04L 5/0092; H04L 5/0094
  See application file for complete search history.

(56) References Cited

U.S. PATENT DOCUMENTS

| 2009/0168662 A1* | 7/2009 | Tsuboi | H04L 1/20 370/252 |
| 2010/0197298 A1* | 8/2010 | So | H04W 24/10 455/424 |
| 2012/0307660 A1* | 12/2012 | Lindoff | H04W 24/10 370/252 |
| 2014/0108838 A1* | 4/2014 | Wei | G06F 9/505 713/322 |
| 2015/0208296 A1* | 7/2015 | Song | H04W 36/0083 370/331 |

\* cited by examiner

*Primary Examiner* — Joseph Dean, Jr.
(74) *Attorney, Agent, or Firm* — Cantor Colburn LLP

(57) ABSTRACT

Method and system for searching network in a Long Term Evolution (LTE) slave mode are provided. The method includes: determining whether the number of frequency points to be measured is greater than N, wherein N is a positive integer; if the number is greater than N, ordering the frequency points to be measured according to their signal strength; selecting, from the ordered frequency points to be measured, N frequency points whose signal strength is greater than other ordered frequency points as optimally selected frequency points; and performing cell search based on the optimally selected frequency points. Based on the above method, the cell search is performed by measuring the N optimally selected frequency points. In this way, the number of measured frequency points is reduced, and a time period for measuring each optimally selected frequency point is prolonged. Therefore, the possibility of finding a cell may be increased.

6 Claims, 4 Drawing Sheets

METHOD AND SYSTEM FOR SEARCHING NETWORK IN LONG TERM EVOLUTION SLAVE MODE

CROSS-REFERENCE TO RELATED APPLICATIONS

The present application claims priority to Chinese patent application No. 201410852997.3, filed on Dec. 31, 2014, and entitled "METHOD AND SYSTEM FOR SEARCHING NETWORK IN LONG TERM EVOLUTION SLAVE MODE", and the entire disclosure of which is incorporated herein by reference.

FIELD OF THE DISCLOSURE

The present disclosure generally relates to network switch, and more particularly, to a method and system for searching network in a Long Term Evolution (LTE) slave mode.

BACKGROUND OF THE DISCLOSURE

In existing multimode systems, when a LTE slave mode is used for network search, all frequency points are measured in turn. Multiple measurement gaps are set for measuring the frequency points, and each measurement gap is allocated for all the frequency points evenly. When one measurement gap is ended, a next measurement gap may start, and the process is performed repeatedly until a signal is found at one frequency point.

In the LTE slave mode, if there are many frequency points to be measured, it takes much time to search network. And a terminal may spend much power consumption in performing the network search, which causes electric quantity of the terminal to decrease quickly. If too many measurement gaps are allocated in the LTE slave mode, messages may be missed in a current master mode, which causes loss in service. Generally, each measurement gap lasts for about 6 ms. However, if there are too few measurement gaps allocated in the LTE slave mode, a LTE cell is hardly searched. Therefore, the terminal needs to stay in the current master mode for a relatively long time, and cannot switch to a network mode having relatively high transmission speed.

SUMMARY

In embodiments of the present disclosure, a method and system for searching network in a LTE slave mode are provided. Compared to the exiting techniques, when relatively few measurement gaps are allocated to perform cell search for relatively many frequency points, the possibility of finding a cell may be increased.

In an embodiment of the present disclosure, a method for searching network in a LTE slave mode is provided, including: determining whether the number of frequency points to be measured is greater than N, wherein N is a positive integer; if the number of frequency points to be measured is greater than N, ordering the frequency points to be measured according to their signal strength; selecting, from the ordered frequency points to be measured, N frequency points whose signal strength is greater than other ordered frequency points as optimally selected frequency points; and performing cell search based on the optimally selected frequency points.

Optionally, the method may further include: after the cell search is performed based on the optimally selected frequency points, determining whether a cell is found; and if no cell is found, performing cell search based on remained frequency points, wherein the remained frequency points denote to the frequency points to be measured except the optimally selected frequency points.

Optionally, the method may further include: after the cell search is performed based on the optimally selected frequency points, determining whether a cell is found; and if no cell is found, performing a normal measurement gap allocation stage.

Optionally, determining whether the number of frequency points to be measured is greater than N may include: determining whether the number of frequency points to be measured is greater than N every first predetermined time period.

Optionally, before determining whether the number of frequency points to be measured is greater than N, the method may further include: performing a measurement configuration stage, where cell search is initialized in a second predetermined time period using the frequency points to be measured and one measurement gap.

Optionally, the method may further include: if it is determined that the number of the frequency points to be measured is smaller than N, performing the normal measurement gap allocation stage to perform cell search, where in the normal measurement gap allocation stage, after generation of a measurement message, in a head second predetermined time period, the cell search is performed using the frequency points to be measured and two measurement gaps; and afterwards, the cell search is performed using ten measurement gaps and the optimally selected frequency points every second predetermined time period.

Optionally, the first predetermined time period may be 20 seconds.

In an embodiment of the present disclosure, a system for searching network in a LTE slave mode is provided, including: a gap bursting module, configured to determine whether the number of frequency points to be measured is greater than N, wherein N is a positive integer; if is determined that the number is greater than N, order the frequency points to be measured according to their signal strength; select, from the ordered frequency points to be measured, N frequency points whose signal strength is greater than other ordered frequency points as optimally selected frequency points; and transmit the optimally selected frequency points to an upper layer control module; and the upper layer control module, configured to perform cell search based on the optimally selected frequency points.

Optionally, the system may further include a first determination module, configured to: determine whether a cell is found; and if it is determined that no cell is found, control the upper layer control module to perform cell search based on remained frequency points, wherein the remained frequency points denote to the frequency points to be measured except the optimally selected frequency points.

Optionally, the system may further include: a second determination module, configured to: determine whether a cell is found; and if it is determined that no cell is found, control the upper layer control module to enter a normal measurement gap allocation stage.

From above, in embodiments of the present disclosure, a plurality of frequency points to be measured are ordered to select N optimally selected frequency points. Cell search is performed by only measuring the N optimally selected frequency points. In this way, the number of measured frequency points is reduced, and a time period for measuring each optimally selected frequency point is prolonged. Therefore, the possibility of finding a cell may be increased.

BRIEF DESCRIPTION OF THE DRAWINGS

In order to clarify solutions of embodiments of the present disclosure or related art, accompanying drawings of the present disclosure or the related art will be described briefly. Obviously, the drawings are just examples and do not limit the scope of the disclosure, and other drawings may be obtained by a person skilled in the art based on these drawings without creative work.

DETAILED DESCRIPTION OF THE DISCLOSURE

Embodiments of the present disclosure provide a method and system for searching network in a LTE slave mode. Compared to the exiting techniques, when relatively few measurement gaps are allocated to perform cell search for relatively many frequency points, the possibility of finding a cell may be increased and further it is easier for a terminal to access to a network mode having relatively high transmission speed.

Embodiments of present disclosure will be described clearly in detail in conjunction with accompanying drawings. The embodiments below are only described for example, and there are many other possible embodiments. Based on the embodiments below, all the other embodiments obtained by those skilled in the art without any creative efforts should belong to the scope of the present disclosure.

Figure 1:
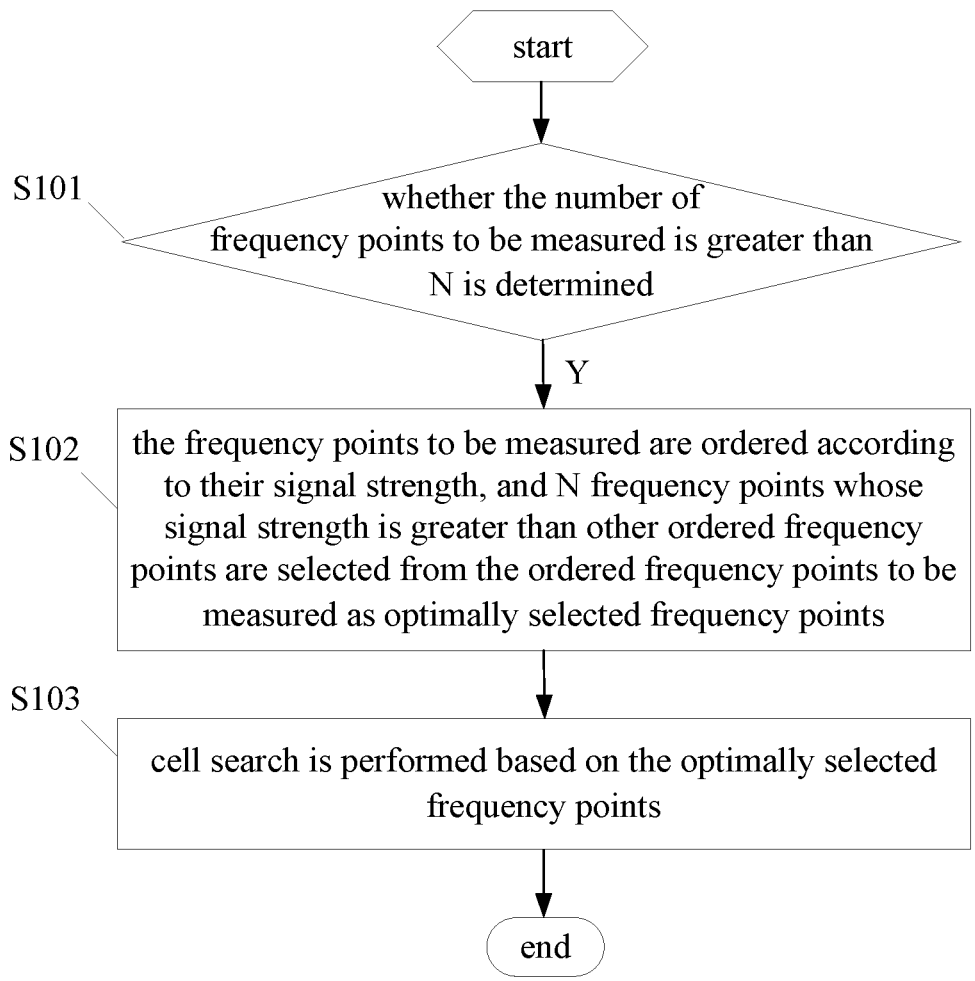
FIG. 1 schematically illustrates a flow chart of a method for searching network in a LTE slave mode according to an embodiment of the disclosure.

FIG. 1 schematically illustrates a flow chart of a method for searching network in a LTE slave mode according to an embodiment of the disclosure. Referring to FIG. 1, the method may include S101 to S103.

In S101, whether the number of frequency points to be measured is greater than N is determined, and if the number of frequency points to be measured is greater than N, the method goes to S102, wherein N is a positive integer which is set according to requirements of a user.

In S102, the frequency points to be measured are ordered according to their signal strength, and N frequency points whose signal strength is greater than other ordered frequency points are selected from the ordered frequency points to be measured as optimally selected frequency points.

In S103, cell search is performed based on the optimally selected frequency points.

Those skilled in the art can understand that, the more the frequency points to be measured are, the longer time the cell search requires. Therefore, in embodiments of the present disclosure, the frequency points to be measured are ordered to select the N optimally selected frequency points. And when the cell search is performed, only the N optimally selected frequency points are measured. In this way, measurement times of frequency points are reduced, accordingly, a measurement time period of the optimally selected frequency points is prolonged, which may increase the possibility of finding a cell. Therefore, in embodiments of the present disclosure, even if there are many frequency points to be measured, a cell may be found relatively quickly, such that a terminal can access to a network mode having relatively high transmission speed.

In some embodiments, the value of N may be determined according to requirements of the user, for example, two or three.

In some embodiments, to avoid a situation that a cell cannot be found based on the optimally selected frequency points, the cell search may be performed based on the optimally selected frequency points for only predetermined times after the ordering. If no cell is found after the predetermined times of cell search, the cell search may be performed based on the remained frequency points to be measured, wherein the remained frequency points denote to the frequency points to be measured except the optimally selected frequency points.

Figure 2:
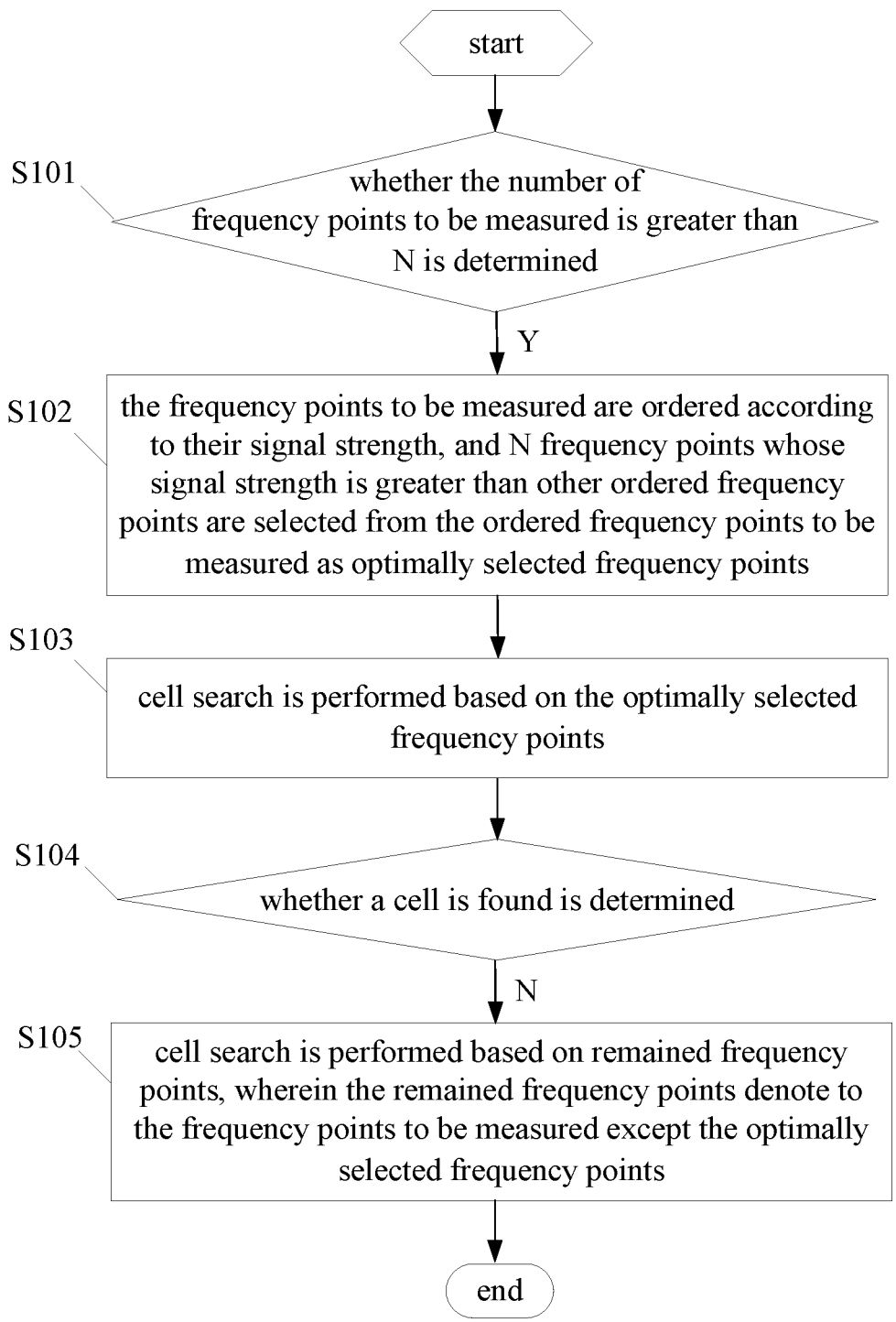
FIG. 2 schematically illustrates a flow chart of a method for searching network in a LTE slave mode according to another embodiment of the disclosure.

FIG. 2 schematically illustrates a flow chart of a method for searching network in a LTE slave mode according to another embodiment of the disclosure. Referring to FIG. 2, in some embodiments, the method may further include S104 and S105.

In S104, whether a cell is found is determined, and if no cell is found, the method goes to S105.

In S105, cell search is performed based on remained frequency points, wherein the remained frequency points denote to the frequency points to be measured except the optimally selected frequency points.

Figure 3:
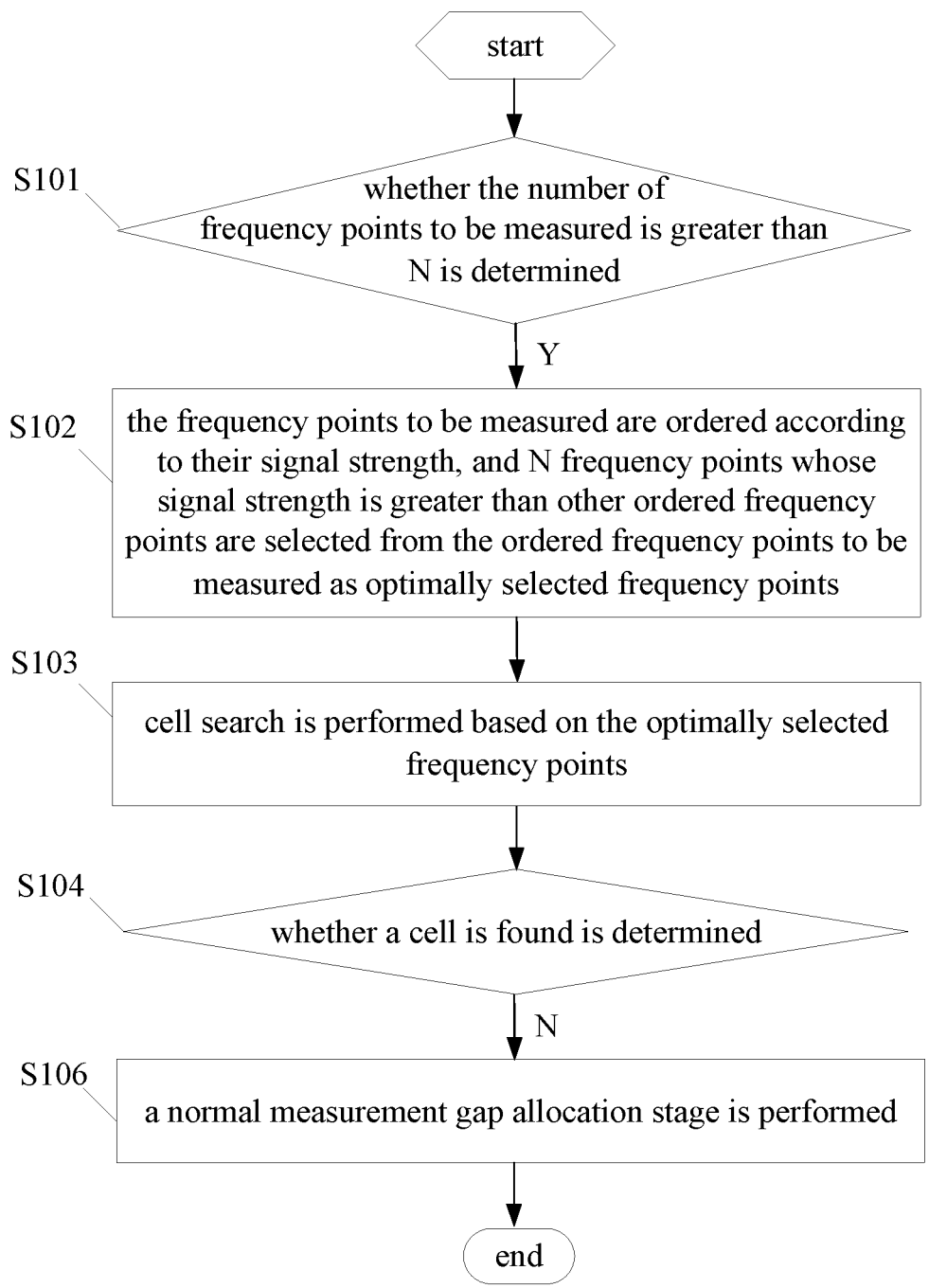
FIG. 3 schematically illustrates a flow chart of a method for searching network in a LTE slave mode according to another embodiment of the disclosure.

FIG. 3 schematically illustrates a flow chart of a method for searching network in a LTE slave mode according to another embodiment of the disclosure. Referring to FIG. 3, in some embodiments, the method may further include S104 and S106.

In S104, whether a cell is found is determined, and if no cell is found, the method goes to S106.

In S106, a normal measurement gap allocation stage is performed.

In some embodiments, the normal measurement gap allocation stage may include: after a measurement request message is generated, in a head first predetermined time period, the cell search is performed using the frequency points to be measured and two measurement gaps; and afterwards, the cell search is performed using ten measurement gaps and the optimally selected frequency points every first predetermined time period.

In some embodiments, the frequency points to be measured may be ordered every second predetermined time period. In some embodiments, the second predetermined time period may be 20 seconds.

In some embodiments, whether the number of the frequency points to be measured is greater than N may be determined every first predetermined time period.

Generally, a cell search process may include two stages, a measurement configuration stage and a normal measurement gap allocation stage.

The measurement configuration stage includes: in the first predetermined time period, initializing cell search using the frequency points to be measured and one measurement gap; and generating a measurement request message after the initialization.

The normal measurement gap allocation stage includes: after a measurement request message is generated, in the head first predetermined time period, the cell search is performed using the frequency points to be measured and two measurement gaps; and afterwards, the cell search is performed using ten measurement gaps and the optimally selected frequency points every first predetermined time period.

In embodiments of the present disclosure, besides the measurement configuration stage and the normal measurement gap allocation stage, the method further includes a gap bursting stage. In the gap bursting stage, the frequency points to be measured are ordered based on their signal strength to select the optimally selected frequency points, and the cell search is performed based on the optimally selected frequency points. In some embodiments, the gap bursting stage is performed between the measurement configuration stage and the normal measurement gap allocation stage. In some embodiments, after the measurement configuration stage, the gap bursting stage is performed. If a cell is found, the normal measurement gap allocation stage may not be performed; or if no cell is found, the normal measurement gap allocation stage is performed.

In the gap bursting stage, if it is determined that the number of the frequency points to be measured is less than N, the normal measurement gap allocation stage is performed to execute the cell search.

Figure 4:
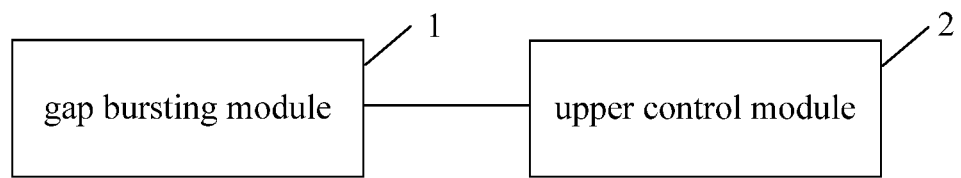
FIG. 4 schematically illustrates a structural diagram of a system for searching network in a LTE slave mode according to an embodiment of the disclosure.

Accordingly, in an embodiment, a system for searching network in a LTE slave mode is provided. Referring to FIG. 4, the system includes a gap bursting module 1 and an upper layer control module 2.

The gap bursting module 1 is configured to: determine whether the number of frequency points to be measured is greater than N, wherein N is a positive integer; if is determined that the number is greater than N, order the frequency points to be measured according to their signal strength; select, from the ordered frequency points to be measured, N frequency points whose signal strength is greater than other ordered frequency points as optimally selected frequency points; and transmit the optimally selected frequency points to the upper layer control module 2.

The upper layer control module 2 is configured to perform cell search based on the optimally selected frequency points.

In some embodiments, the system may further include a first determination module, configured to: determine whether a cell is found; and if it is determined that no cell is found, control the upper layer control module 2 to perform cell search based on remained frequency points, wherein the remained frequency points denote to the frequency points to be measured except the optimally selected frequency points.

In some embodiments, the system may further include a second determination module, configured to: determine whether a cell is found; and if it is determined that no cell is found, control the upper layer control module 2 to enter a normal measurement gap allocation stage.

In some embodiments, the system may further include a measurement configuration module and a normal measurement gap allocation module. The measurement configuration module is configured to control the system to enter a measurement configuration stage, and the normal measurement gap allocation module is configured to control the system to enter a normal measurement gap allocation stage.

In the present disclosure, the various embodiments are described in a progressive way. The focus of each embodiment is different from that of other embodiments. And the same or the similar parts between the respective embodiments can refer to each other.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for searching network in a Long Term Evolution (LTE) slave mode, comprising:
   determining whether the number of frequency points to be measured is greater than N, wherein N is a positive integer;
   if the number of frequency points to be measured is greater than N, ordering the frequency points to be measured according to their signal strength; selecting, from the ordered frequency points to be measured, N frequency points whose signal strength is greater than other ordered frequency points as optimally selected frequency points; and performing cell search based on the optimally selected frequency points; and
   if the number of the frequency points to be measured is smaller than N, performing a normal measurement gap allocation stage to perform cell search, where in the normal measurement gap allocation stage, after generation of a measurement message, in a head second predetermined time period, the cell search is performed using the frequency points to be measured and two measurement gaps; and afterwards, the cell search is performed using ten measurement gaps and the optimally selected frequency points every second predetermined time period.

2. The method according to claim 1, further comprising:
   after the cell search is performed based on the optimally selected frequency points, determining whether a cell is found; and
   if no cell is found, performing cell search based on remained frequency points, wherein the remained frequency points denote to the frequency points to be measured except the optimally selected frequency points.

3. The method according to claim 1, further comprising:
   after the cell search is performed based on the optimally selected frequency points, determining whether a cell is found; and
   if no cell is found, performing a normal measurement gap allocation stage.

4. The method according to claim 1, wherein determining whether the number of frequency points to be measured is greater than N comprises: determining whether the number of frequency points to be measured is greater than N every first predetermined time period.

5. The method according to claim 1, further comprising: before determining whether the number of frequency points to be measured is greater than N, performing a measurement configuration stage, where cell search is initialized in a second predetermined time period using the frequency points to be measured and one measurement gap.

6. The method according to claim 4, wherein the first predetermined time period is 20 seconds.

* * * * *